United States Patent [19]

Lell et al.

[11] 4,315,904

[45] Feb. 16, 1982

[54] PROCESS FOR REMOVING HYDROGEN SULPHIDE AND SULPHUR DIOXIDE FROM CLAUS TAIL GASES

[75] Inventors: Rainer Lell, Kerpen; Ghazi R. Al-Muddarris, Cologne; Reinhard Pachaly, Kerpen, all of Fed. Rep. of Germany

[73] Assignee: Davy International Aktiengesellschaft, Frankfurt, Fed. Rep. of Germany

[21] Appl. No.: 158,903

[22] Filed: Jun. 12, 1980

[30] Foreign Application Priority Data

Jun. 13, 1979 [DE] Fed. Rep. of Germany ....... 2923895

[51] Int. Cl.$^3$ ............................................. C01B 17/02
[52] U.S. Cl. ................................ 423/574 R; 423/244; 423/576
[58] Field of Search ............... 433/576, 574 G, 574 R, 433/242 A, 242 R, 243, 244 A, 244 R; 423/230

[56] References Cited

U.S. PATENT DOCUMENTS

| 2,760,848 | 8/1956 | Dunning | 23/225 |
|---|---|---|---|
| 2,767,062 | 10/1956 | Duecker | 23/226 |
| 3,702,884 | 11/1972 | Hunt et al. | 423/222 |
| 4,035,474 | 7/1977 | Kunkel | 423/574 R |

FOREIGN PATENT DOCUMENTS

| 1809329 | 1/1970 | Fed. Rep. of Germany . | |
|---|---|---|---|
| 2021111 | 12/1970 | Fed. Rep. of Germany . | |
| 717488 | 10/1954 | United Kingdom . | |
| 722038 | 1/1955 | United Kingdom | 423/574 |
| 1307716 | 2/1973 | United Kingdom . | |
| 1444632 | 8/1976 | United Kingdom . | |

OTHER PUBLICATIONS

Gas Purification, Kohl et al., 1979, pp. 407–421.

*Primary Examiner*—O. R. Vertiz
*Assistant Examiner*—Gregory A. Heller
*Attorney, Agent, or Firm*—Bernard, Rothwell & Brown

[57] ABSTRACT

A process for removing hydrogen sulphide and sulphur dioxide from a Claus reaction tail gas comprises separating the tail gas into two partial streams, conducting the first partial stream through a first catalyst bed charged with sulphur while at a temperature above the sulphur dew point, separating out the discharged sulphur from the first partial stream by condensation, combining the first partial stream freed from sulphur with the second partial stream, and passing the combined gas stream through a second catalyst bed already freed from sulphur while at a temperature below the sulphur dew point. When the second catalyst bed becomes charged with sulphur and the first catalyst bed becomes free of sulphur, the flow of gas through the beds is reversed.

18 Claims, 1 Drawing Figure

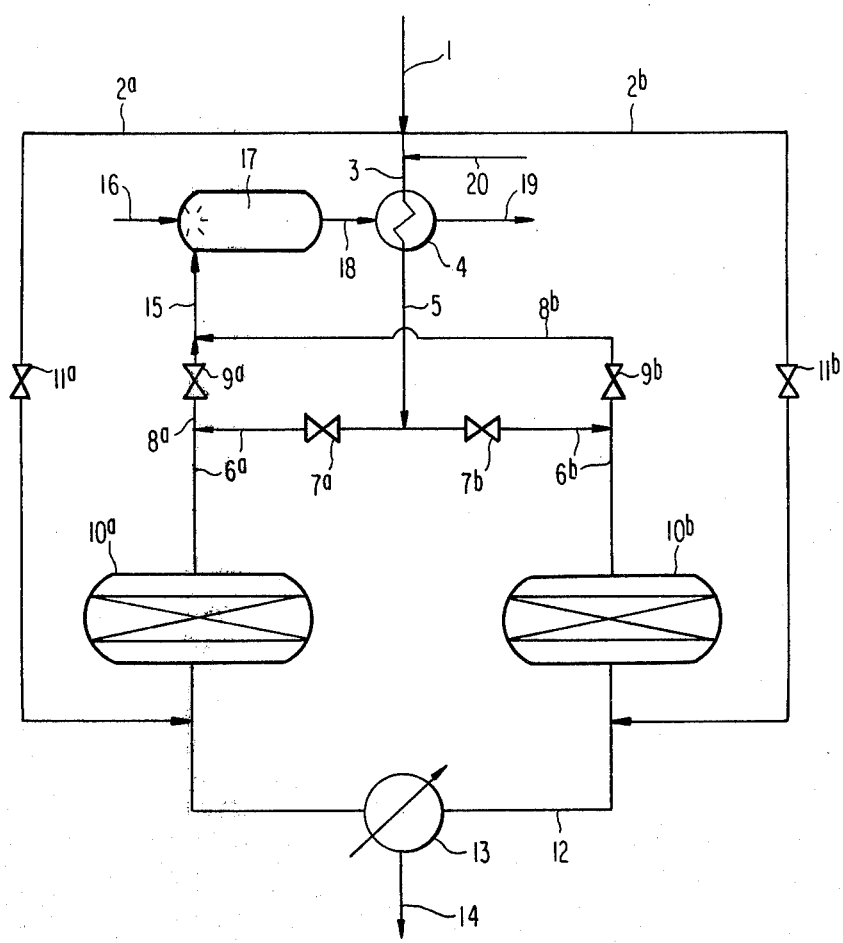

PROCESS FOR REMOVING HYDROGEN SULPHIDE AND SULPHUR DIOXIDE FROM CLAUS TAIL GASES

The present invention relates generally to a process for removing hydrogen sulphide and sulphur dioxide from Claus reaction tail gases.

In the production of elemental sulphur from a gas containing hydrogen sulphide, generally a third of the moles of the hydrogen sulphide in the gas is oxidized to sulphur dioxide and this sulphur dioxide is then reacted with the residual hydrogen sulphide in accordance with the Claus reaction;

$$2H_2S + SO_2 \rightarrow 3/xS_x + 2H_2O$$

to yield elemental sulphur. The Claus reaction can be affected thermally at temperatures from, for example, 800° to 1400° C., or catalytically at temperatures between, for example, 120° and 340° C. In order to obtain a high sulphur yield and a final gas of acceptable purity, the gas is successively reacted in a thermal stage and in a catalytic stage. In the thermal stage, the hydrogen sulphide is partially burnt to sulphur dioxide and, from the resulting sulphur dioxide and hydrogen sulphide, there is partial formation of sulphur. By cooling the gas to a temperature below the sulphur dew point, for example, to about 120° to 250° C., the formed sulphur is condensed out of the gas stream. In this manner, up to about 70% of the sulphur contained in the starting gas as hydrogen sulphide is thereby separated out. The remaining gases are then further reacted on a Claus catalyst at a temperature above the sulphur dew point. Normally, the gas flows through at least two such Claus catalyst stages, between which the reaction gas is cooled to a temperature below the sulphur dew point, the condensed sulphur is removed and the remaining gas is heated again before entering the next Claus catalyst stage. The tail gas of such a Claus plant is generally subjected to an incineration in order to convert remaining hydrogen sulphide into the less toxic sulphur dioxide and is then discharged into the atmosphere. About 5 to 10% of the sulphur contained in the initial gas in the form of H$_2$S is still emitted into the atmosphere with this tail gas. With regard to the contamination of the atmosphere and the sulphur losses which are connected therewith, a further purification of the Claus tail gases is therefore urgently necessary.

It is known that the H$_2$S and SO$_2$ content of Claus tail gases can be further reduced by converting the H$_2$S and SO$_2$ components to elemental sulphur in the presence of a Claus type catalyst at temperatures below the sulphur dew point, for example, between 132° and 149° C., a so-called "cold bed" catalyst bed. By use of the lower reaction temperature in this additional catalytic stage, the thermodynamic equilibrium with the exothermic Claus reaction is shifted towards the side of sulphur, i.e. to lower H$_2$S and SO$_2$ concentrations. On the other hand, because the formed sulphur is deposited on the catalyst, the sulphur concentration in the gaseous reaction mixture and thus also the equilibrium concentration of H$_2$S and SO$_2$ are reduced. Since the deposited sulphur impedes the catalytic reaction proportionally to the amount of sulphur deposited, the Claus catalyst has to be regenerated from time to time by evaporating the deposited sulphur with a hot gas and driving the sulphur out of the catalyst bed followed by cooling the catalyst back to the required operational temperature.

Generally speaking, two such cold bed catalyst beds are utilized in tandem, one bed being charged with the Claus tail gas while the other bed is being regenerated with hot gas and then cooled again. Serving for the regeneration of the catalyst beds may be a separate gas circulation system with a condenser, fan and heater, in which a considerable quantity of fuel gas is consumed in order to heat the circulation gas to the regeneration temperature (see U.S. Pat. No. 3,702,884). It is also known to use the hot tail gas of the first catalytic Claus stage, prior to cooling and sulphur separation, for the regeneration of the charged cold bed. This regeneration procedure has the defect that the regeneration gas has a comparatively high sulphur vapor pressure and, as a consequence, the desired rapid concentration by evaporation of the sulphur from the bed to be regenerated is not achieved and, even with the commencement of the regeneration, when the bed is still cold, further sulphur is able to condense in the bed (see U.S. Pat. No. 4,035,474).

Finally, it is known to conduct the Claus tail gases, initially at a temperature above the sulphur dew point, through a first cold bed charged with sulphur to thereby evaporate the sulphur from the bed, then to free the tail gases from the elemental sulphur by cooling them to a temperature below the sulphur dew point and then to conduct the cooled tail gases, below the sulphur dew point, through a second catalyst bed in which the further sulphur formation and separation takes place. However, all the Claus tail gas has to be heated to the regeneration temperature when using this operating procedure and then has to be cooled to the sulphur condensation temperature, the associated heat exchanger and sulphur condenser have to be given correspondingly large dimensions (see German Offenlegungsschrift 2021111).

The present invention seeks to avoid the above indicated defects of the known processes. More particularly, the present invention disposes with a regeneration system for the circulation of a regeneration gas and thus the reactivation of the catalyst bed is achieved at a low equipment cost.

Accordingly, the invention is based on a process for removing hydrogen sulphide and sulphur dioxide from Claus tail gas where the process comprises conducting the gas through a first catalyst bed charged with sulphur and at a temperature above the sulphur dew point, cooling the tail gas containing the sulphur discharged in vapor form from the first bed to a temperature below the sulphur dew point so as to condense the sulphur, separating the condensed sulphur from the tail gases, conducting the tail gas through a second catalyst bed freed in this manner beforehand from sulphur and at a temperature below the sulphur dew point and reversing the direction of flow of the gas through the catalyst beds when the first bed is freed from sulphur and the second bed is charged with sulphur. According to the present invention, an improved process is achieved by the fact that the Claus tail gas is separated into two partial streams, the first partial stream being conducted through the first catalyst bed charged with sulphur. After the sulphur separation, this partial stream is combined with the second partial stream, and the combined partial streams are conducted through the second catalyst bed. Since only a portion of the Claus tail gas is used according to the invention for driving sulphur out of the charged bed, the size and expense of the heat exchanger for heating the gas used for the regeneration and also the size and expense of the sulphur condenser and of the associated pipe conduits and shut-off members are reduced. Simultaneously, savings in heat energy and, more especially, fuel gas are realized since only a portion of the Claus tail gas is required to be heated to the regeneration temperature. By using the process according to the present invention, about 70% of the sulphur compounds contained in the Claus tail gas may be removed, i.e. the total sulphur conversion amounts to 98.5%, as compared with 95% of a usual Claus plant without a subsequent cold bed stage.

Before entering the charged catalyst bed, the first partial stream from the Claus tail gas is advantageously heated by indirect heat exchange to a temperature above the sulphur dew point. With this indirect heat exchange, it is possible, for example, for a combination gas to serve as heat-yielding medium. In addition, the recombined partial streams are preferably subjected to an incineration after leaving the second catalyst bed and the first partial stream may be heated by heat exchange with this incinerated gas. The incineration can take place thermally at temperatures in the range from 600° to 800° C. or catalytically at temperatures in the range from 300° to 500° C. The $SO_2$ content in the incineration gas is in the region of 0.15% by volume. The incinerated gas can be discharged into the atmosphere through a stack.

According to a preferred embodiment of the process according to the present invention, the ratio by volume between the first partial stream and the second partial stream is selected to be in the range from about 30:70 to about 99:1, more especially in the range from about 50:50 to about 90:10. By this reduction in volume of the tail gas used in the regeneration, the heat exchanger utilized to heat up the first partial stream for the regeneration and also the sulphur condenser located between the two catalyst beds can be given correspondingly smaller dimensions.

The Claus reaction in the combined first and second partial streams which flow through the second catalyst bed is expediently carried out at a temperature in a range from above the sulphur melting point up to about 160° C. At this low reaction temperature, not only is there achieved a continuing conversion of hydrogen sulphide and sulphur dioxide to elemental sulphur, but the formed sulphur is simultaneously deposited in the catalyst bed and thus a pre-condition for an improved conversion is provided. According to the preferred embodiment of the process according to the present invention, the first partial stream is heated to a temperature in the range from about 10° C. above the reaction temperature existing in the second catalyst bed up to about 600° C., advantageously in the range from about 300° to 400° C. The deposited sulphur in the catalyst bed vaporises under these conditions and is discharged from the bed by the gas flow from the bed.

According to a preferred embodiment of the process according to the invention, the first partial stream is allowed to flow with a space velocity of about 100 to 1400 $h^{-1}$, advantageously from about 400 to 1000 $h^{-1}$, through the first catalyst bed and the combined partial streams flow with a space velocity of about 500 to 2000 $h^{-1}$, advantageously from about 800 to 1600 $h^{-1}$, through the second catalyst bed, the space velocities being related to gas volumes at normal conditions, i.e., at about 0° C., and 760 mm Hg. It is expedient to operate in the first and second catalyst beds with gas velocities, related to gas volumes at normal conditions, in the ranges from about 0.05 to 1.1 m/s, advantageously about 0.1 to 0.75 m/s, and from about 0.1 to 1.2 m/s, advantageously about 0.2 to 0.8 m/s, respectively. The height of the bed is advantageously about 0.8 to 1.3 m. The bed height and correspondingly the catalyst volume can also be substantially larger; the charging, regeneration and cooling times are then correspondingly longer.

Furthermore, the $H_2S/SO_2$ molar ratio in the combined partial streams which enter the second catalyst bed is preferably adjusted to the stoichiometrically required value, especially to about 2.0.

In accordance with one particular embodiment of the process according to the invention, a reducing gas, advantageously hydrogen, is added to the first partial stream before entry of the stream into the first catalyst bed for the regeneration of the catalyst. Since the catalyst experiences a slight loss in activity with each charging and discharging operation, the loss not being cancelled out by the discharge of sulphur, reactivation with a reducing gas is necessary from time to time for efficient operation. In such a reactivation, higher oxidation stages of the sulphur are thereby again reduced. If the reducing gas is added to the first partial stream over a relatively long period of time, i.e., during a relatively large number of charging and discharging cycles, the loss in activity can be substantially cancelled out without the desulphurization of the Claus tail gas in accordance with the invention having to be interrupted.

In order to cancel out or substantially reduce this loss in activity, it is also possible for fuel or sour gas to be burnt or combusted sub-stoichiometrically in the first partial stream before its entry into the first catalyst bed for the regeneration of the catalyst, such a burning of the gas thereby heats the partial stream to a temperature above the sulphur dew point and forms reducing components in said stream. In this manner, both the elevated temperature of the first partial streams necessary for the evaporation of sulphur and also reducing substances, as for example hydrogen, necessary for restoring the initial catalytic activity are provided. With regard to the regeneration with the reducing gas constituents, the operation is carried out with the same reversing cycles as with the separation and expulsion of sulphur so that the normal Claus operation is not deleteriously affected by this reactivation of the initial catalytic activity and the conversion to elemental sulphur is maintained at a high level.

The amount of reducing gas or reducing gas constituents in the first partial stream may vary considerably but is generally a minor proportion of the partial gas stream. Preferably, the ratio by volume between the reducing gas or the reducing gas constituents and the first partial stream is in the range from about 1:99 to 50:50, most preferably, in the range of about 5:95 to 25:75.

Moreover, the gas used in the reactivation of the catalyst may also be subjected to an incineration. The excess of the reducing gas constituents are consequently not lost, but are utilized for generating heat. During these reactivation phases, the consumption of fuel gas for the incineration can consequently be lowered.

The present invention is hereinafter more fully described by way of example by reference to the drawing in which a flow diagram of an apparatus for carrying the process of the invention into effect is diagrammatically represented.

The tail gas freed from elementary sulphur and discharging from the last Claus stage of a conventional Claus plant (not shown) is supplied through pipe 1. A portion of this gas flows through pipe 3 into heat exchanger 4 in which the gas is heated with hot incineration gas to a temperature necessary for regenerating the catalyst, for example, about 350° C. The heated partial stream passes through pipe 5 to distributor pipe $6^a$ and $6^b$.

For regenerating catalyst bed $10^b$ and charging catalyst bed $10^a$, value $7^b$ in branch pipe $6^b$ is opened and valve $7^a$ in branch pipe $6^a$ is closed. Correspondingly, valves $9^a$ and $11^a$ are open and valves $9^b$ and $11^b$ are closed. The gas heated in heat exchanger 4 consequently flows through pipe $6^b$ onto catalyst bed $10^b$ and thereby vaporises the sulphur which has been deposited in the bed. The tail gas charged with sulphur flows through pipe 12 into sulphur condenser 13 where the gas temperature is lowered to below the sulphur dew point and the condensed sulphur is separated out. The condensed liquid sulphur leaves the apparatus through pipe 14. The gas flowing out of condensor 13 is combined with the remainder of the Claus tail gas supplied through pipe $2^a$ and the combined gas then flows through the catalyst bed $10^a$ where $H_2S$ and $SO_2$ still contained in the gas are converted at low temperature, for example at 120° C., to elemental sulphur which is deposited in the catalyst bed. The Claus tail gas thus substantially freed from sulphur and sulphur compounds then passes through branch pipe $6^a$, pipe $8^a$ with open valve $9^a$ and pipe 15 into incineration furnace 17 where fuel gas/air mixture supplied through pipe 16 is burnt. At the same time, hydrogen sulphide still remaining in the Claus tail gas is burnt to sulphur dioxide. The hot combustion gases flow through pipe 18 into heat exchanger 4 where the hot gases heat the partial stream of tail gas for the regeneration of bed $10^b$ and leave the installation by way of pipe 19 leading to a stack (not shown).

When catalyst bed $10^a$ is charged with sulphur and bed $10^b$ is freed from sulphur, valves $7^a$, $9^b$ and $11^b$ are opened and valves $7^b$, $9^a$ and $11^a$ are closed. The heated partial stream of the Claus tail gas then flows counter-clockwise through pipe $6^a$, catalyst bed $10^a$, pipe 12 with sulphur condenser 13, and then, after combination with the remainder of the Claus tail gas conducted through pipe $2^b$, passes through catalyst bed $10^b$ and pipes $6^b$, $8^b$ and 15, and once again to the incineration furnace. By reversing the valves from time to time, the direction of flow in the cycle is reversed so that catalyst beds $10^a$ and $10^b$ are alternately charged and regenerated. If the catalyst beds with this operating procedure suffer losses in activity which cannot be regenerated, the partial stream for the regeneration may have a reducing gas added thereto in pipe 3 by way of pipe 20.

While the present invention has been described with reference to particular embodiments thereof, it will be understood that numerous modifications may be made without departing from the spirit and scope of the invention.

It is claimed:

1. A process for removing hydrogen sulphide and sulphur dioxide from Claus tail gases comprising separating the Claus tail gases into a first and second partial streams, conducting the first partial stream at a temperature above the sulphur dew point through a first catalyst bed charged with sulphur, cooling the first partial stream containing sulphur discharged in vapor form from the first catalyst bed to a temperature below the sulphur dew point for condensation of the sulphur, separating the condensed sulphur from the first partial stream, combining the first partial stream with the second partial stream, conducting the combined partial streams at a temperature below the sulphur dew point through a second catalyst bed freed previously from sulphur, and reversing the direction of flow of the gas streams through the catalyst beds when the first catalyst bed is freed from sulphur and the second catalyst bed is charged with sulphur.

2. A process according to claim 1 wherein the first partial stream, before entering the charged first catalyst bed, is heated by heat exchange to a temperature above the sulphur dew point.

3. A process according to claim 2, wherein the recombined partial streams are subjected to an incineration after leaving the second catalyst bed to product a hot incineration gas and the first partial stream is heated by heat exchange with the hot incineration gas.

4. A process according to claims 1, 2 or 3, wherein the ratio by volume between the first partial stream and the second partial stream is in the range from 30:70 to 99:1.

5. A process according to claim 4 wherein the ratio by volume between the first partial stream and the second partial stream is in the range from 50:50 to 90:10.

6. A process according to claim 1 wherein the catalytic reaction conducted in the combined streams flowing through the second catalyst bed is at a temperature in the range from above the sulphur melting point up to 160° C.

7. A process according to claim 2 wherein the first partial stream is heated to a temperature in the range from 10° C. above the reaction temperature existing in the second catalyst bed up to 600° C.

8. A process according to claim 7 wherein the first partial stream is heated to a temperature in the range from 300° to 400° C.

9. A process according to claim 1 wherein the first partial stream is allowed to flow with a space velocity of 100 to 1400 $h^{-1}$ through the first catalyst bed and the combined partial streams are allowed to flow with a space velocity of 500 to 2000 $h^{-1}$ through the second catalyst bed, the space velocities being related to gas volumes at 0° C. and 760 mm Hg.

10. A process according to claim 9 wherein the first partial stream is allowed to flow with a space velocity of 400 to 1000 $h^{-1}$ through the first catalyst bed and the combined partial streams are allowed to flow with a space velocity of 800 to 1600 $h^{-1}$ through the second catalyst bed.

11. A process according to claim 1 wherein the first and second catalyst beds are operated with gas velocities, related to gas volumes under normal conditions, in the ranges from 0.05 to 1.1 m/s and from 0.1 to 1.2 m/s, respectively.

12. A process according to claim 11, wherein the first and in the second catalyst bed are operated with gas velocities in the ranges from 0.1 to 0.72 m/s and 0.2 to 0.8 m/s, respectively.

13. A process according to claims 1, 2, 3 or 4, wherein the $H_2S/SO_2$ molar ratio in the combined partial streams entering the second catalyst bed is adjusted to the stoichiometrically required value.

14. A process according to claim 1, wherein a reducing gas for reactivating catalyst is added to the first partial stream before the stream enters the first catalyst bed for the regeneration of the catalyst.

15. A process according to claim 14, wherein the reducing gas is hydrogen.

16. A process according to claim 1, wherein fuel gas is combusted sub-stoichiometrically in the first partial stream before the stream enters the first catalyst bed for the regeneration of the catalyst and thereby the first partial stream is heated to the temperature above the sulphur dew point and forms reducing components in said first partial stream for reactivating catalyst.

17. A process according to claims 14, 15 or 16, wherein the gas used for the reactivation of the catalyst is incinerated after leaving the second catalyst bed.

18. A process according to claim 16, wherein the fuel gas is at least partially replaced by sour gas in the sub-stoichiometric combustion.

* * * * *